United States Patent

Engel et al.

[15] 3,667,042

[45] May 30, 1972

[54] CIRCUIT ARRANGEMENT FOR REMOTE INDICATION OF THE ROTARY MOVEMENT OF A SHAFT

[72] Inventors: Walter Engel, Nurnberg-Eibach; Dieter Flachsbarth, Ruckersdorf; Hermann Schwarz, Henfenfeld, all of Germany

[73] Assignee: Siemens Aktiengesellschaft, Berlin and Munich, Germany

[22] Filed: Oct. 28, 1969

[21] Appl. No.: 871,897

[30] Foreign Application Priority Data

Nov. 14, 1968 Germany ..................... P 18 08 768.8

[52] U.S. Cl. .............................................. 324/174, 324/45
[51] Int. Cl. ........................................................ G01p 3/54
[58] Field of Search ................... 324/69, 70, 45, 34 PS, 34 D; 235/92, 29 D

[56] References Cited

UNITED STATES PATENTS

| | | |
|---|---|---|
| 2,906,945 | 9/1959 | Weiss ....................................... 324/45 |
| 3,396,333 | 8/1968 | Ho ........................................... 324/70 |
| 3,477,022 | 11/1969 | Le Masters .............................. 324/70 |

*Primary Examiner*—Michael J. Lynch
*Attorney*—Curt M. Avery, Arthur E. Wilfond, Herbert L. Lerner and Daniel J. Tick

[57] ABSTRACT

An electronic pulse generator has a permanent magnet driven by a shaft and a stationary Hall generator in operative proximity with the magnet. The base electrode of a transistor is directly connected to one of the Hall voltage electrodes of the Hall generator. The stator winding of a stepping motor is connected to the emitter-collector circuit of the transistor, is driven by the Hall voltage via the transistor, and in turn drives a speedometer coupled to the transistor.

2 Claims, 3 Drawing Figures

CIRCUIT ARRANGEMENT FOR REMOTE INDICATION OF THE ROTARY MOVEMENT OF A SHAFT

DESCRIPTION OF THE INVENTION

The invention relates to a circuit arrangement for remote indication of the rotary movement of a shaft. More particularly, the invention relates to a circuit arrangement for remote indication of the rotary movement of a shaft of an automotive vehicle.

The circuit arrangement of the invention comprises an electric pulse generator and a coupling circuit coupling said generator to a speedometer and an odometer for indicating the rotary speed and the rotary distance traveled by a shaft. The electronic pulse generator includes a permanent magnet driven by the shaft and a stationary Hall generator. Known electronic pulse generators of the aforedescribed type require a relatively large output, since the Hall generator must be connected in series with an amplifying and adjusting stage in order to control a switching transistor, for example.

To provide a remote indication or measurement of the rotary speed, or revolutions per minute, of a shaft such as, for example, a marine engine shaft, a permanent magnet is provided to rotate with the shaft. The permanent magnet acts upon a magnetic switch which constantly reverses the polarity of the operating voltage of a rotating armature mechanism. The armature mechanism is provided with a counter. The apparatus is described in German Patent DAS 1,004,081. Other apparatus for the remote indication or measurement of the speed of a shaft or a motor utilizes an electronic generator coupled to the shaft. The voltage produced by the generator is indicative of the rotary speed of the shaft. This is disclosed in German Pat. No. 764,021.

The principal object of the invention is to provide a new and improved circuit arrangement for remote indication of the rotary movement of a shaft.

An object of the invention is to provide a circuit arrangement for remote indication of the rotary movement of a shaft, which circuit arrangement operates efficiently and reliably despite a curtailment in output.

An object of the invention is to provide a circuit arrangement which functions efficiently, effectively, reliably and accurately to provide a remote indication of the rotary movement of a shaft.

An object of the invention is to provide a circuit arrangement which is highly suitable for indicating or measuring the rotary speed and rotary distance traveled by a vehicle, without the need for a flexible tachometer shaft.

In accordance with the invention, a circuit arrangement for remote indication of the rotary movement of a shaft comprises an electronic pulse generator having a permanent magnet driven by the shaft and a stationary Hall generator in operative proximity with the magnet. The Hall generator has a pair of control electrodes and a pair of Hall voltage electrodes. The base electrode of a transistor is directly connected to one of the Hall voltage electrodes of the Hall generator. A speedometer and an odometer are coupled to the transistor for indicating the speed and the rotary distance traveled by the shaft.

The Hall generator thus directly controls the transistor, or switching transistor, in a manner whereby only one of the two Hall voltage electrodes is utilized by being connected to the base electrode of said transistor. In this case, the Hall generator thus functions as a field plate, so that the switching transistor is reliably controlled by overcoming a threshold or limit value. In order to improve the temperature conditions of a Hall generator, a constant voltage is applied via a diode which is connected in parallel with the control current electrodes of a Hall generator.

A stepping motor is coupled to and drives the speedometer and odometer. The transistor is connected to the stepping motor in a manner whereby the Hall voltage produced by the Hall generator drives the motor. The stepping motor has a permanently magnetic rotor and a non-inductively wound stator winding. The stator winding has one branch connected to a control electrode of the Hall generator and another branch connected to the emitter-collector circuit of the transistor. The stepping motor includes an engaging pole. The current flowing through the other branch of the stator winding of the stepping motor is approximately twice the magnitude of the current flowing through the one branch of the stator winding.

A timing circuit includes a flip flop having an output and an input coupled to the transistor. A counter has an excitation winding coupled to the output of the flip-flop. The transistor drives the counter. The flip-flop comprises first and second transistors coupled to each other. The excitation winding of the counter is connected to and functions as the working impedance of the second transistor of the flip-flop.

The speedometer comprises a voltmeter connected in parallel with the second transistor of the flip-flop. A pair of diodes protects the second transistor. Each of the diodes is connected to a corresponding one of the electrodes of the second transistor.

In order that the invention may be readily carried into effect, it will now be described with reference to the accompanying drawing, wherein.

In the FIGS., the same components are identified by the same reference numerals.

Figure 1:
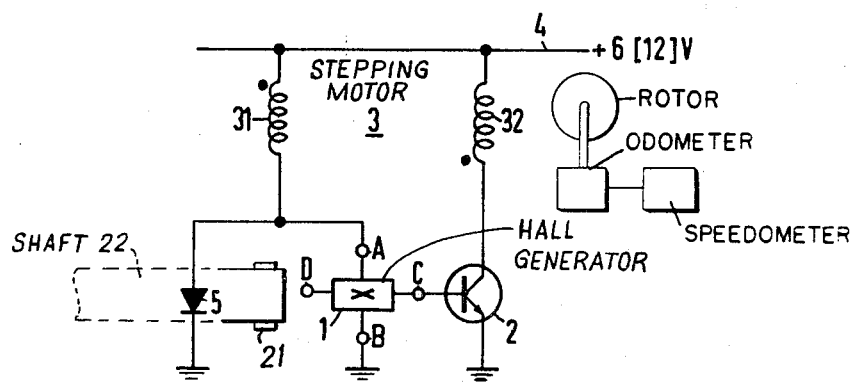
FIG. 1 is a circuit diagram of an embodiment of the circuit arrangement of the invention.

In the circuit arrangement of FIG. 1, a multipole or two-pole magnet 21 is driven by a rotatable shaft 22 such as, for example, the shaft of a vehicle, such as an automotive vehicle. A Hall generator 1 has control electrodes A and B and Hall voltage electrodes C and D. The Hall voltage electrode D is not connected in the circuit. The other Hall voltage electrode C is directly connected to the base electrode of a transistor, or switching transistor, 2.

In the circuit arrangement of FIG. 1, one half of the Hall generator 1 functions as a Hall generator and the other half functions as a field plate. As a result, the Hall generator 1 delivers such high voltages that the threshold or limited value of the transistor 2 may be readily overcome. This eliminates the necessity for amplifier and adjusting stages which would have to be utilized, in series connection with the Hall generator and which would result in a considerable reduction of the output.

A permanent magnet stepping motor 3 comprises a non-inductively wound stator winding having individual winding branches 31 and 32. The leading terminal of each of the winding branches 31 and 32 is indicated by a dot. The winding branch 31 is connected in the control current path of the Hall generator 1, since it is directly connected to the control electrode A of said Hall generator. The winding branch 32 is connected in the emitter-collector circuit of the transistor 2, since it is directly connected to the collector electrode of said transistor.

A non-inductively wound stator is a bifilar wound stator. The stator is thus double wound. The stator winding may also be manufactured with both winding branches 31 and 32 wound, one behind the other, in the same sense and provided with a center tap which is later connected to a lead 4.

The lead 4 is connected to the positive polarity terminal of a voltage source such as, for example, a battery (not shown in the FIGS.) which provides a voltage of 6 or 12 volts. A diode 5 is connected in parallel with the control electrodes A and B of the Hall generator 1. The diode 5 assists in the application of a constant voltage of, for example, 0.8 volt, to the control electrodes of the Hall generator 1. The current flow is steady from the lead 4 to ground through the winding branch 31 and the diode 5. This current is substantially constant, so that there is a constant voltage drop at the diode 5. A constant voltage is thus also applied to the control electrodes A and B of the Hall generator.

Figure 2:
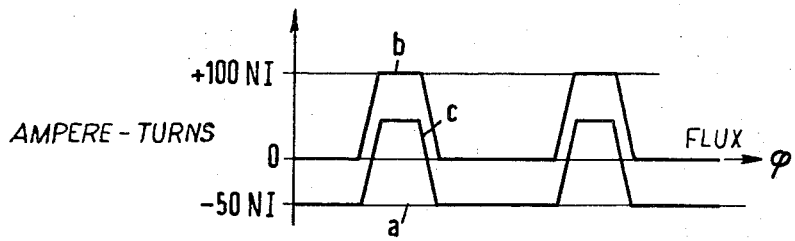
FIG. 2 is a graphical presentation of the flux in the stator windings of the stepping motor of the circuit arrangement of FIG. 1.

When the transistor 2 is in its non-conductive condition, the winding branch 31 conducts a current of such magnitude and direction that −50 ampere-turns, for example, is produced in said winding branch. This is indicated in FIG. 2 by the line $a$. If the transistor 2 is controlled by the magnet 21, which magnet is in operative proximity with the Hall generator 1, the winding branch 32 of the stepping motor 3 conducts a current of such magnitude and direction that +100 ampere-turns is produced in said winding branch, as indicated by the line $b$ of FIG. 2.

The resultant ampere-turns for the stepping motor 3 thus changes from a negative to a positive magnitude, as shown by the curve $c$ of FIG. 2. Each polarity change of the ampere-turns corresponds to a step of the motor. A stepping motor with and engaging pole is preferably utilized. In FIG. 2, the abscissa represents the flux $\phi$ and the ordinate represents ampere-turns NI.

An engaging pole is a pole with a resting moment. Every motor excited by a permanent magnet has a more or less great resting moment if it has distinct poles. A motor of this type is shown, for example, in U.S. Pat. No. 3,396,333 to Ho et al. The motor of the Ho et al. patent also has a stator winding 60, 61 which corresponds to the stator winding 31, 32 of the present invention.

Since one of the two winding branches 31 and 32 is always conductive, a clear engaging position is provided. The stepping motor 3 may drive an eddy current tachometer or speedometer and an odometer in the usual manner. The odometer may comprise a counter which counts the rotary distance traveled by the shaft.

Figure 3:
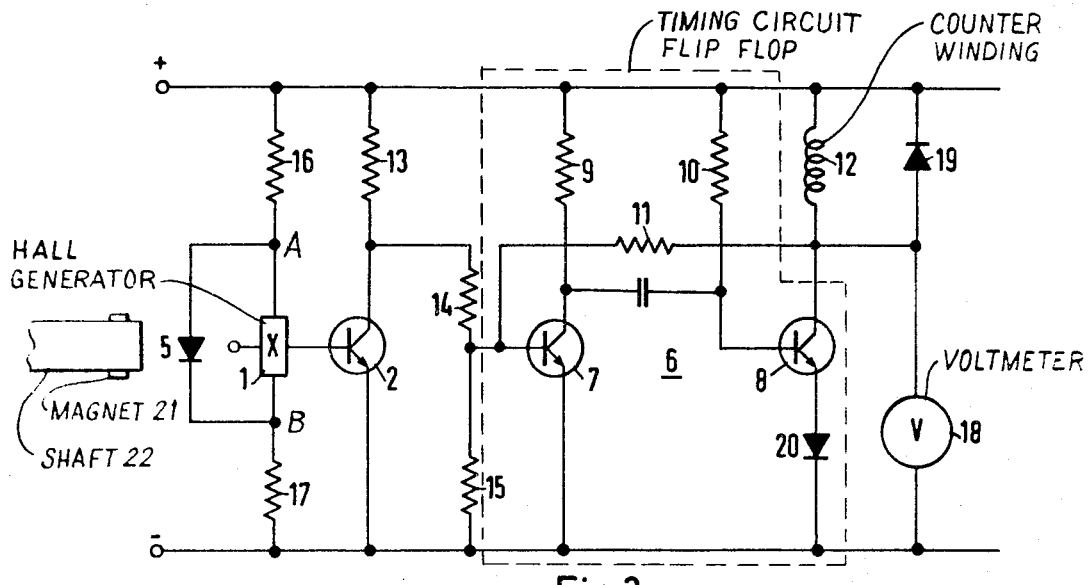
FIG. 3 is a circuit diagram of another embodiment of the circuit arrangement of the invention.

In the embodiment of FIG. 3, the transistor 2 controls a timing circuit which comprises a bistable multivibrator or flip-flop 6. The flip-flop comprises a first transistor 7, a second transistor 8 and a plurality of resistors 9, 10, and 11. A counter includes a winding 12 which controls the operation of such counter electromagnetically. The counter winding 12 is connected directly to the collector-electrode of the transistor 8 of the flip-flop 6. The counter winding 12 therefore functions as the working impedance of the transistor 8. The counter may indicate the number of revolutions of the shaft 22 or the distance travelled by a vehicle of which said shaft is part.

A plurality of resistors 13, 14, and 15 control the operation of the flip-flop 6 of the timing circuit. The resistor 13 is connected directly to the collector-electrode of the transistor 2. The resistors 14 and 15 are connected in series circuit arrangement and said series circuit arrangement is connected in parallel with the emitter-collector path of the transistor 2. The base electrode of the first transistor 7 of the flip flop 6 is connected to a common point in the connection between the resistors 14 and 15.

A pair of resistors 16 and 17 provide the required potential for the transistor 2. The resistor 16 is directly connected between the control electrode A of the Hall generator 1 and the positive polarity terminal of the voltage source represented by +. The resistor 17 is directly connected between the control electrode B of the Hall generator 1 and the negative polarity terminal of the voltage source indicated by −.

A voltmeter 18, which may be calibrated directly in revolutions, indicates the speed of rotation of the shaft 22. The voltmeter 18 is connected in parallel with the emitter-collector path of the second transistor 8 of the timing circuit flip-flop 6. The transistor 8 is protected against overvoltages by a diode 19 and a diode 20. The diode 19 is directly connected between the collector-electrode of the transistor 8 and the positive polarity terminal of the voltage source. The diode 20 is directly connected between the emitter-electrode of the transistor 8 and the negative polarity terminal of the voltage source.

The timing circuit flip-flop 6 may also control or drive a stepping motor (not shown in FIG. 3), which may in turn drive an eddy current tachometer or speedometer and an odometer, in the usual manner.

While the invention has been described by means of specific examples and in specific embodiments, we do not wish to be limited thereto, for obvious modifications will occur to those skilled in the art without departing from the spirit and scope of the invention.

We claim:

1. A circuit arrangement for remote indication of the rotary movement of a shaft, said circuit arrangement comprising an electronic pulse generator having a permanent magnet driven by said shaft and a stationary Hall generator in operative proximity with said magnet, said Hall generator having a pair of control electrodes and a pair of Hall voltage electrodes;

a transistor having emitter, collector, and base electrodes and an emitter-collector circuit, the base electrode of said transistor being directly connected to one of the Hall voltage electrodes of said Hall generator;

speedometer and odometer means coupled to said transistor for indicating the speed and the rotary distance traveled by said shaft; and a stepping motor coupled to and driving said speedometer and odometer means, said stepping motor having a permanently magnetic rotor and a non-inductively wound stator winding, the stator winding of the stepping motor having two winding branches, one of which is connected to a control electrode of the Hall generator and another of which is connected to the emitter-collector circuit of said transistor in a manner whereby the Hall voltage produced by said Hall generator drives said motor.

2. A circuit arrangement as claimed in claim 1, wherein when the transistor is in its conductive condition current flows through the other branch of the stator winding of the stepping motor and when the transistor is in its non-conductive condition current flows through the one branch of said stator winding, the current flowing through the other branch of the stator winding of said stepping motor being approximately twice the magnitude of the current flowing through the one branch of said stator winding.

* * * * *